Figure 1:
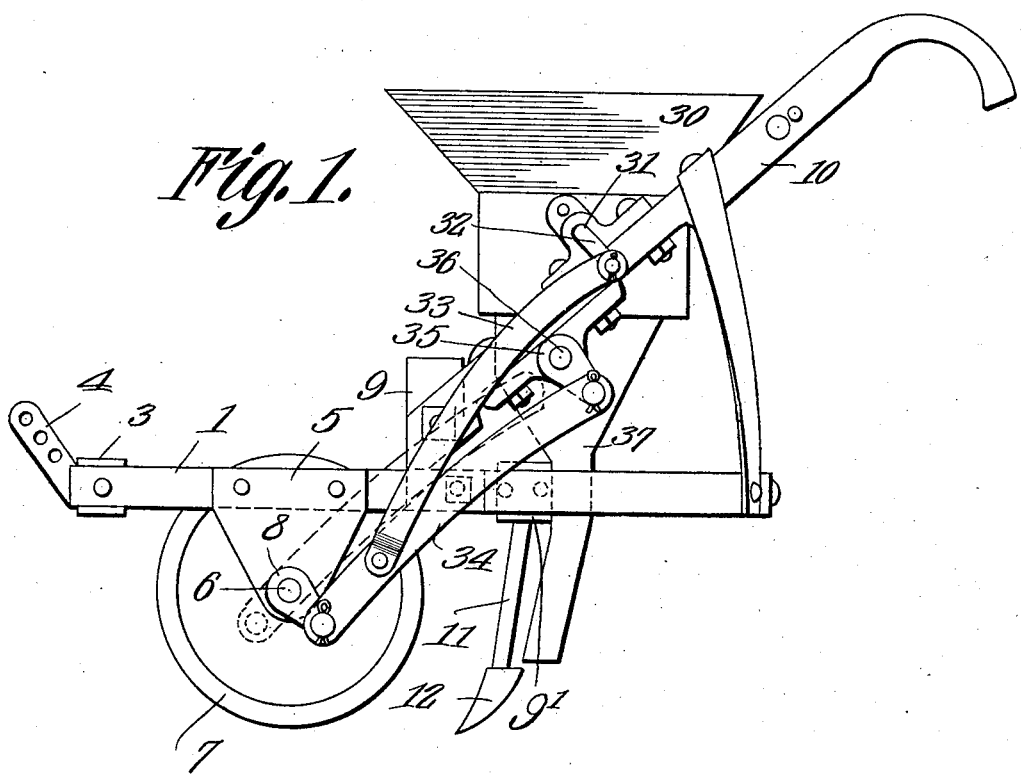

J. B. MERKEL & W. M. REYNOLDS.
COMBINED PLANTER AND FERTILIZER DISTRIBUTER.
APPLICATION FILED JUNE 19, 1911.

1,033,605.

Patented July 23, 1912.

2 SHEETS—SHEET 1.

Witnesses

James B. Merkel and
Walter M. Reynolds Inventors,
by C. A. Snow & Co.
Attorneys.

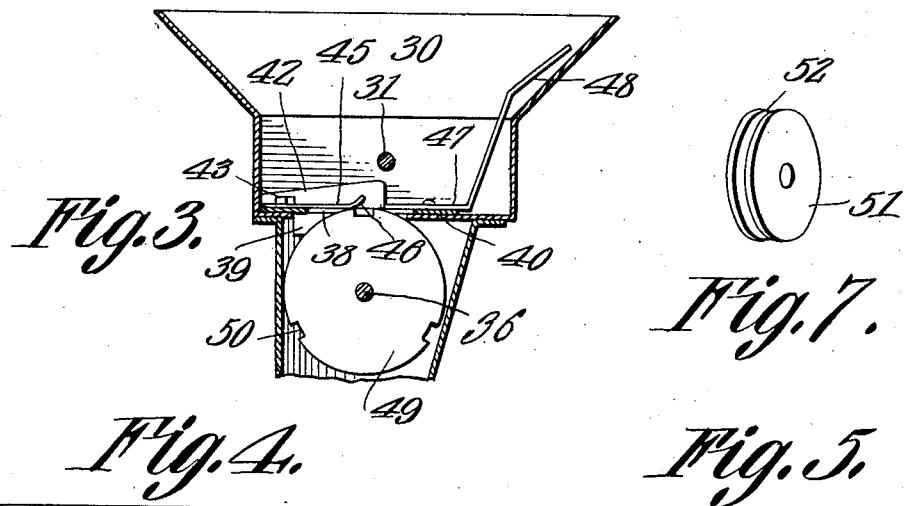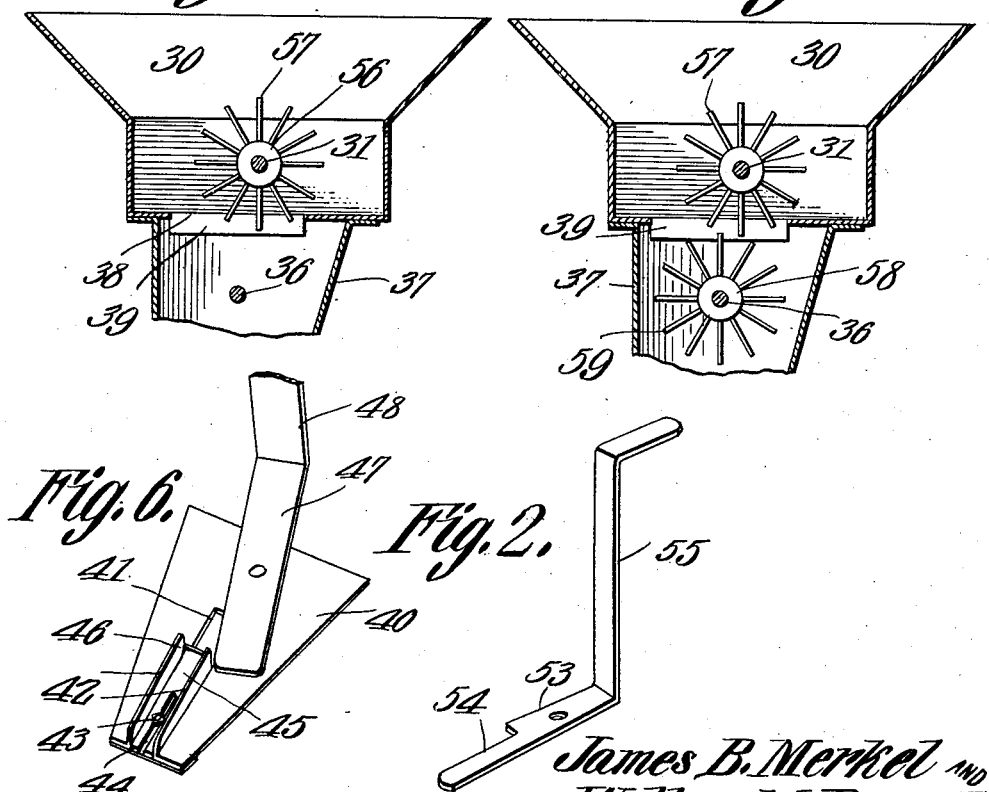

UNITED STATES PATENT OFFICE.

JAMES B. MERKEL AND WALTER M. REYNOLDS, OF HATTIESBURG, MISSISSIPPI.

COMBINED PLANTER AND FERTILIZER-DISTRIBUTER.

1,033,605.     Specification of Letters Patent.     Patented July 23, 1912.

Application filed June 19, 1911. Serial No. 633,945.

*To all whom it may concern:*

Be it known that we, JAMES B. MERKEL and WALTER M. REYNOLDS, citizens of the United States, residing at Hattiesburg, in the county of Forrest, State of Mississippi, have invented a new and useful Combined Planter and Fertilizer-Distributer, of which the following is a specification.

This invention relates to combined planters and fertilizer distributers, one of the objects of the invention being to provide means whereby the dropping mechanism can be readily changed so as to adapt the machine for use in planting seeds of different kind and in dropping and spreading fertilizer.

A further object is to provide yielding means for regulating the discharge of seed from the hopper, said yielding means being so arranged and constructed as to prevent injury to grain forced thereagainst by the dropping devices.

A still further object is to combine with the planter a smoothing element yieldingly connected to said planter, the covering plows being adjustably connected to the frame of the planter in a novel manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

In said drawings:—Figure 1 is a side elevation of the machine. Fig. 2 is a perspective view of a form of cut-off. Fig. 3 is a longitudinal section through the hopper and showing a dropping disk combined with the hopper. Fig. 4 is a section through the hopper and showing another form of dropping means. Fig. 5 is a view similar to Fig. 4 and showing still another form of dropping means. Fig. 6 is a perspective view of the false bottom. Fig. 7 is a perspective view of a modified form of seed dropping disk.

Referring to the figures by characters of reference 1 designates a beam made up of an elongated strip of metal folded upon itself at the center, the ends of said strip being bolted or otherwise fastened to opposed faces of a block 3 from which a clevis 4 extends. Bearing members 5 are fastened to and extend downwardly from the beam adjacent the block 3 and a shaft 6 is journaled within these members and has a supporting wheel 7 secured to it, the upper portion of the wheel projecting into and through the beam. Cranks 8 are arranged at the ends of the shaft 6 and are preferably arranged at 90 degrees to each other.

Blocks 9 and 9' are arranged between the sides of beam 1 and close to but in rear of the wheel 7, and forwardly converging handles 10 are secured at their front ends upon the block 9. The standard 11 of a furrow opener 12 extends through an opening in the block 9' and is secured therein in any manner desired, the said standard being adjustable longitudinally within the opening.

A hopper 30 is arranged between the handles 10 and has a shaft 31 extending transversely of the lower portion thereof, said shaft being provided at one end with a crank 32 engaged by a link 33 pivotally connected to a pitman 34. Two pitmen 34 are provided and each is mounted on the cranks 8 and extend rearwardly over the guide strips 13 to cranks 35 formed at the ends of a shaft 36 journaled upon the lower faces of the handles 10 and extending transversely under the hopper 30 and through the upper portion of the seed tube 37 which extends back of the furrow opener 12. The bottom of the hopper 30 has a longitudinal slot 38 provided, along its sides, with parallel depending flanges 39 projecting into the upper end of the feed tube 37. A false bottom 40 is mounted on the bottom of the hopper and has a longitudinal slot 41 adjacent one end, there being parallel upstanding flanges 42 formed along the sides of the slot and extended to one end of the false bottom. A guide and fastening bolt 43 is arranged within the false bottom between one end thereof and the slot 41 and between the flanges 42, this bolt projecting into a slot 44 formed in one end of a regulating plate 45. Said plate is preferably formed of a length of spring metal one end of which is upturned, as indicated at 46 so as to constitute a deflector. This plate can be shifted longitudinally so as to regulate the size of the discharge opening in the false bottom 40. A cut-off plate 47 is pivotally connected to the false bottom and has an upstanding arm 48 projecting above the hopper where it can be readily reached for the purpose of swinging the cut-off plate so as to close the opening 41.

When it is desired to use the machine for planting corn, a disk, such as indicated at 49, is secured to the shaft 36, this disk having one or more seed receiving notches 50 in its periphery. It will be apparent that when the machine is moved forward shaft 36 will be rotated, bringing the notches 50 successively into register with the outlet opening 41 in the false bottom and with the opening 38 in the bottom of the hopper. The seed will thus be conveyed downwardly under the plate 45 and dropped into the tube 37 directly back of the furrow opener 12. Should more than a desired quantity of grain become lodged within anyone of the notches or pockets in the disk 49, the seeds will not become crushed but will, instead, force the upturned end 46 of plate 45 upwardly provided said plate does not scrape the surplus seeds out of the notch or recess 50. By shifting the arm 48 and the cut-off plate 47, the supply of seed to the tube 37 can be stopped, and by shifting the plate 45 longitudinally, the amount of seed supplied to each recess 50 may be controlled. Obviously by substituting disks 49 having more or fewer notches, the distances between the hills can be varied.

Should it be desired to use the machine for planting small seeds, a disk 51 having an annular groove 52 may be substituted for the disk 49. To use the machine for planting cotton seed, the false bottom is removed from the hopper and a cut-off plate such as illustrated at 53 is pivotally mounted upon the bottom of the hopper, this cut-off plate having an elongated recess 54 in one side thereof and an operating handle 55. The disk is removed from the shaft 36 and another disk 56 is arranged within the hopper and upon the shaft 31, this disk being formed with radially extending fingers 57. It will thus be apparent that when the machine is moved forward, shaft 31 will be rocked and the fingers 57 will force the cotton seed downwardly through the bottom of the hopper and into the tube 37. However, by shifting the cut-off plate so as to bring the downwardly extending fingers 57 within the recess 54, the size of the opening in the bottom of the hopper will be reduced to such an extent as practically to prevent the escape of any of the seeds acted on by the fingers.

In using the machine for distributing fertilizer, another disk 58 having radial fingers 59 is secured to the shaft 36, these fingers 59 operating in a plane at one side of the path of movement of the fingers 57. As the two shafts 31 and 36 are simultaneously rotated, the disks carried thereby will be correspondingly moved, the fingers 57 serving to agitate the fertilizer within the hopper and cause it to drop through the opening 38 while the fingers 59 throw the fertilizer downwardly into the tube 37.

What is claimed is:—

1. A machine of the class described including a supporting wheel, a structure connected thereto and movable therewith, a hopper carried by said structure and having an outlet in the bottom thereof, a false bottom removably mounted within the hopper and having an opening therein registering with the opening in the hopper bottom, and a spring controlling plate adjustably mounted on the false bottom, said plate having an upturned deflecting terminal portion.

2. A machine of the class described including a hopper, said hopper having an opening in the bottom thereof, a seed tube extending downwardly from the hopper, a false bottom removably mounted within the hopper and having an opening registering with the opening in the bottom of the hopper, a cut-off plate movably mounted on the false bottom, a controlling plate of spring metal adjustable longitudinally of the false bottom and having an upturned deflecting terminal portion, and parallel upstanding flanges along the sides of said plate.

In testimony that we claim the foregoing as our own, we have hereto affixed our signatures in the presence of two witnesses.

JAMES B. MERKEL.
WALTER M. REYNOLDS.

Witnesses:
  G. J. McDUFF,
  R. F. SMITH.